United States Patent Office 3,497,442
Patented Feb. 24, 1970

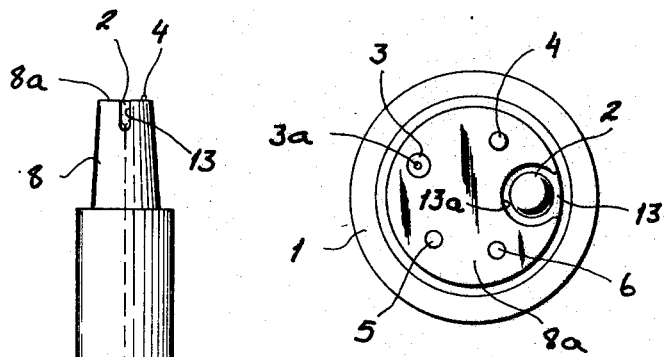
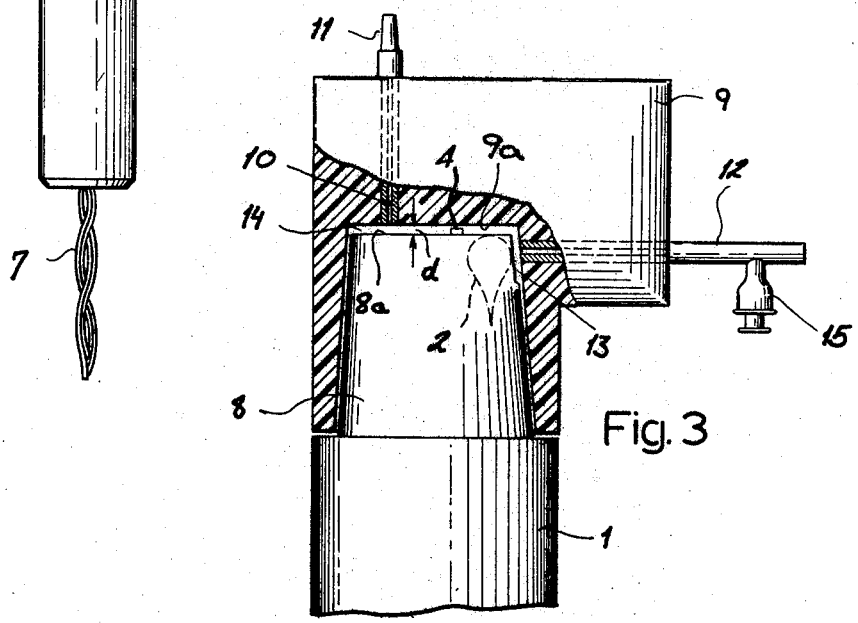

3,497,442
FLUID TESTING DEVICE
Louis-Claude Vincent, 3 Bis Rue du General Delanne,
Neuilly-sur-Seine, France
Filed Feb. 8, 1967, Ser. No. 614,583
Int. Cl. B01k 3/00
U.S. Cl. 204—195     10 Claims

ABSTRACT OF THE DISCLOSURE

Device for the testing of body fluids, either in direct contact with fluids of the human body (e.g. in the oral cavity) or on a separate fluid sample, with at least three electrodes so disposed on a substantially flat face of a holder as to terminate approximately flush therewith, including a glass electrode, a reference electrode (e.g. of calomel), an ionically inert electrode (e.g. of platinum) and, preferably, two additional electrodes, with an outgoing cable for connecting a pH-meter between the glass and reference electrodes and an $rH_2$-meter between the glass and inert electrodes while a resistance meter may also be connected between the additional electrods; a cap may be removably fitted onto an extremity of the holder bearing the aforementioned electrodes and defining with that extremity a fluid chamber adapted to receive the sample of fluid to be tested.

---

My present invention relates to a device for the testing of body fluids, e.g. as generally disclosed in my prior U.S. Patent No. 2,886,771.

As explained in that patent, the parameters to be tested in such devices include the acidity (pH), the oxidation-reduction potential ($rH_2$ or $rO_2$) and the electronic resistance of a liquid, semi-liquid, solution or gel. These tests may be performed with the aid of five electrodes, i.e. a reference electrode (preferably of the calomel type), an ionically inert electrode (e.g. of platinum), a hydrogen (glass) electrode, and two additional electrodes forming part of a conductivity cell. Thus, a pH-meter and an $rH_2$-meter may be connected between the glass electrode on the one hand and, respectively, the reference electrode and the inert electrode on the other hand, while a resistance meter may be bridged across the two additional electrodes.

The general object of my present invention is to provide a device of this type which is compact and easy to handle for tests performed directly on moist tissue outside or in the body of a patient, e.g. upon introduction into the oral cavity.

A more particular object of this invention is to provide a device of the type described which may be readily adapted for the testing of small samples of fluid removed from the body of a patient, e.g. immediately upon withdrawal of such fluids from the body with the aid of a suitable syringe.

The device embodying my present invention comprises a holder, preferably in the form of an elongated handle, having a substantially flat face fitted with the aforementioned test electrodes which terminate approximately coplanar and flush with that face so as to be exposed to a fluid contacting the end of the holder upon, say, its introduction into a body cavity. These electrodes are connected to their respective meters through a flexible cable projecting from the other end of the holder.

According to a more specific feature of my invention, the electrode-bearing extremity of the handle-shaped holder co-operates with a cap adapted to be removably fitted thereon to form with that extremity a fluid chamber of relatively small volume (e.g. a fraction of 1 cc.), this chamber being of limited depth (e.g. slightly greater than 1 mm.) transverse to the holder face so as to insure an adequate spread of the fluid across this face for purposes of measurement. The fluid to be tested may be circulated through the chamber through respective conduits forming an inlet and an outlet therefor.

The invention will be described in greater detail with reference to the accompanying drawing in which:

FIG. 1 is a side-elevational view of a probe embodying my invention;

FIG. 2 is a top view of the probe shown in FIG. 1, drawn to a larger scale; and

FIG. 3 is an enlarged side-elevational view (parts broken away) of the top of the probe of FIGS. 1 and 2 having a removable cap fitted thereon to define a fluid chamber.

The probe shown in FIG. 1 comprises an elongated handle 1 with a frustoconical upper extremity 8 topped by a flat face 8a, this face being the side of the upper ends of five electrodes including a glass electrode 2, a calomel electrode 3, a platinum electrode 4 and two resistance-measuring electrodes 5, 6. The lower terminals of these electrodes, not shown, are connected within holder 1 to respective conductors of a flexible cable 7, extending toward the respective meters (pH, $rH_2$, resistivity) which are to be included in the several test circuits described above. Calomel electrode 3 is formed with a microcapillary passage 3a for the usual salt solution (e.g. potassium chloride) which separates the calomel from the fluid to be tested. The fluid-contacting ends of all the electrodes 2–6 are virtually coplanar, with platinum electrode 4 projecting only slightly above face 8a for faster depolarization.

I use, the tapering head 8 of probe 1 may be inserted into a cavity of a patient's body and pressed with its face 8a against a moist internal tissue, e.g. of the inner lip or the tongue, so as to contact the fluid layer on that tissue while measurements are taken. In the same manner, the face 8a may be brought into contact with natural or synthetic fluid-impregnated tissues outside the body.

If only a small quantity of fluid is available, the head 8 may be introduced into a complementary female member 9 forming a cap therefor, as illustrated in FIG. 3, a narrow fluid chamber 14 being defined between the face 8a and a confronting inner cap surface 9a; the spacing d of faces 8a and 9a may be on the order of 1 mm. Two tubes 10, 12 extend through the cap 9 and open into the chamber 14, tube 10 terminating in a nipple 11 to which a syringe may be attached. Tube 12 has a nipple 15 for connection to a source of partial vacuum, not shown, to facilitate aspiration of the fluid into the chamber 14 via tube 10.

In the arrangement shown, outlet tube 12 enters the tapering bore of cap 9 from the side and confronts the glass electrode 2 through a lateral cutout 13 formed in the head 8 next to that electrode to facilitate the outflow of the fluid; as best seen in FIG. 2, electrode 2 is surrounded by a clearance 13a which communicates wtih cutout 13 and insures wide-area irrigation of its surface by the fluid.

For optimum spacing, as likewise shown in FIG. 2, I prefer to place the electrodes 2–6 in a polygonal array near the periphery of face 8a. The relative position of these electrodes, however, and other structural details of the embodiment described and illustrated may be varied without departing from the spirit and scope of my invention.

I claim:

1. A device for testing body fluids, comprising a holder with a substantially flat face; a set of electrodes in said holder terminating substantially flush with said face and including a glass electrode, a reference electrode and an ionically inert electrode, said face having a recess surrounding said glass electrode with clearance; and conductor means connected to said electrodes in said holder and extending outwardly therefrom for connecting a pH-meter between said glass and reference electrodes and an $rH_2$-meter between said glass and inert electrodes.

2. A device as defined in claim 1 wherein said electrodes further include a pair of additional electrodes connectable by said conductor means across a resistance meter.

3. A device as defined in claim 1 wherein said inert electrode projects slightly beyond said face.

4. A device as defined in claim 1 wherein said holder is an elongated handle with a reduced extremity forming said face.

5. A device as defined in claim 4, further comprising a cap removably fitting onto said extremity and forming therewith a fluid chamber bounded in part by said face, said cap being provided with conduits forming inlet and outlet means for the circulation of a fluid to be tested.

6. A device as defined in claim 4 wherein said electrodes are spaced apart in a substantially circular array along the periphery of said extremity.

7. A device as defined in claim 1 wherein said reference electrode is a calomel electrode with a microcapillary outlet.

8. A device for testing body fluids, comprising an elongated handle with a reduced extremity forming a substantially flat face; a set of electrodes in said handle terminating substantially flush with said face and including a glass electrode, a reference electrode and an ionically inert electrode; conductor means connected to said electrodes in said handle and extending outwardly therefrom for connecting a pH-meter between said glass and reference electrodes and an $rH_2$-meter between said glass and inert electrodes, and a cap removably fitting onto said extremity and forming therewith a fluid chamber bounded in part by said face, said cap being provided with conduits forming inlet and outlet means for the circulation of a fluid to be tested, said extremity being provided with a lateral cutout adjacent said glass electrode, one of said conduts terminating close to said cutout.

9. A device as defined in claim 8 wherein said extremity has a recess open toward said chamber and surrounding said glass electrode with clearance.

10. A device for testing body fluids, comprising an elongated handle with a reduced extremity forming a substantially flat face; a set of electrodes in said handle terminating substantially flush with said face and including a glass electrode, a reference electrode and an ionically inert electrode; conductor means connected to said electrodes in said handle and extending outwardly therefrom for connecting a pH-meter between said glass and reference electrodes and an $rH_2$-meter between said glass and inert electrodes; and a cap removably fitting onto said extremity and forming therewith a fluid chamber bounded in part by said face, said cap being provided with conduit means forming inlet and outlet means for the circulation of a fluid to be tested, said extremity having a recess open toward said chamber and surrounding said glass electrode with clearance.

References Cited

UNITED STATES PATENTS

| | | | |
|---|---|---|---|
| 2,176,471 | 10/1939 | Pyle et al. | |
| 2,886,771 | 5/1959 | Vincent | 204—195 |
| 3,071,530 | 1/1963 | Neville | 204—195 |
| 3,151,052 | 9/1964 | Arthur et al. | 204—195 |
| 3,259,124 | 7/1966 | Hillier et al. | 128—2.1 |

T. TUNG, Primary Examiner

U.S. Cl. X.R.

128—2.1; 324—30